United States Patent
Hamer et al.

(10) Patent No.: US 10,339,207 B2
(45) Date of Patent: Jul. 2, 2019

(54) IDENTIFYING A FUNCTIONAL FRAGMENT OF A DOCUMENT OBJECT MODEL TREE

(71) Applicant: ENTIT SOFTWARE LLC, Sanford, NC (US)

(72) Inventors: Philip Edward Hamer, Alpharetta, GA (US); Shawn Morgan Simpson, Alpharetta, GA (US); Stephen Daniel Hardeman, Alpharetta, GA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 317 days.

(21) Appl. No.: 15/116,857

(22) PCT Filed: Apr. 22, 2014

(86) PCT No.: PCT/US2014/034888
§ 371 (c)(1),
(2) Date: Aug. 5, 2016

(87) PCT Pub. No.: WO2015/163850
PCT Pub. Date: Oct. 29, 2015

(65) Prior Publication Data
US 2017/0220531 A1 Aug. 3, 2017

(51) Int. Cl.
*G06F 17/22* (2006.01)
*G06F 16/957* (2019.01)

(52) U.S. Cl.
CPC ........ *G06F 17/2211* (2013.01); *G06F 16/957* (2019.01); *G06F 17/2247* (2013.01)

(58) Field of Classification Search
CPC .................................................. G06F 17/2247
See application file for complete search history.

(56) References Cited

U.S. PATENT DOCUMENTS

| | | | |
|---|---|---|---|
| 6,675,354 B1 * | 1/2004 | Claussen | G06F 17/2247 715/205 |
| 7,509,654 B2 * | 3/2009 | Jennings | G06F 9/4494 719/318 |
| 7,536,389 B1 | 5/2009 | Prabhakar et al. | |
| 7,660,804 B2 | 2/2010 | Wen et al. | |
| 7,698,317 B2 | 4/2010 | Sasturkar et al. | |
| 8,024,384 B2 | 9/2011 | Prabhakar et al. | |
| 8,554,800 B2 | 10/2013 | Goldentouch | |
| 9,785,623 B2 * | 10/2017 | Leventhal | G06F 17/2247 |
| 2002/0143774 A1 * | 10/2002 | Vandersluis | G06F 17/30389 |
| 2011/0258532 A1 | 10/2011 | Ceze et al. | |
| 2012/0059859 A1 | 3/2012 | Jiao et al. | |

(Continued)

OTHER PUBLICATIONS

King et al., "Distributed XML Query Processing: Fragmentation, Localization and Pruning," Technical Report CS-2010-02, Sep. 2010 (Revised Mar. 2011), University of Waterloo Cheriton School of Computer Science, pp. 1-52.*

"Defining Match Patterns in <xsl:template>," retrieved from https://msdn.microsoft.com/en-us/library/ms754602(d=printer,v=vs.85).aspx, Jun. 19, 2018, pp. 1-3.*

Stack Overflow, "xml—XSLT Ignore duplicate elements," available at https://stackoverflow.com/questions/18897691/xslt-ignore-duplicate-elements, Sep. 19, 2013, pp. 1-6.*

(Continued)

*Primary Examiner* — Amelia L Tapp

(57) ABSTRACT

A functional fragment of a document object model (DOM) tree is identified based on detecting at least one handler associated with at least one corresponding element of the DOM tree. In response to determining that the identified functional fragment matches a previously processed functional fragment, the identified functional fragment is excluded from further processing.

18 Claims, 4 Drawing Sheets

(56) References Cited

U.S. PATENT DOCUMENTS

2012/0109927 A1    5/2012  Prasad
2013/0332444 A1    12/2013 Kondratova et al.
2014/0164352 A1*   6/2014  Denninghoff ...... H03H 9/02622
                                                      707/711

OTHER PUBLICATIONS

El-Mahgary, "Filtering XMLDocuments Using XPath: XFilter and YFilter," Spring 2010, pp. 1-19.*
Deepayan Chakrabarti and Rupesh R. Mehta, "The Paths More Taken: Matching DOM Trees to Search Logs for Accurate Webpage Clustering," Proceedings of the 19th International Conference on World Wide Web, Apr. 26-30, 2010, pp. 1-10, ACM.
International Search Report and Written Opinion, International Application No. PCT/US2014/034888, dated Dec. 18, 2014, pp. 1-11, KIPO.
Mozilla Developer Network, "Introduction—Document Object Model (DOM) | MDN," Jan. 3, 2014, pp. 1-7, Available at: <developer.mozilla.org/en-US/docs/DOM/DOM_Reference/Introduction>.
Philippe Le Hegaret et al., "What is the Document Object Model?," Nov. 13, 2000, pp. 1-7, Available at: <w3.org/TR/DOM-Level-2-Core/introduction.html>.
Seyed M. Mirtaheri et al., "Dist-RIA Crawler: A Distributed Crawler for Rich Internet Applications," 2013 Eighth International Conference on P2P, Parallel, Grid, Cloud and Internet Computing, Oct. 28-30, 2013, pp. 105-112, IEEE.

\* cited by examiner

IDENTIFYING A FUNCTIONAL FRAGMENT OF A DOCUMENT OBJECT MODEL TREE

BACKGROUND

Web content accessible over a network is available at websites hosted by web servers on the network. Web content can be in the form of web pages that can be retrieved by a client device to render the web page at the client device.

BRIEF DESCRIPTION OF THE DRAWINGS

Some implementations are described with respect to the following figures.

DETAILED DESCRIPTION

Figure 1:
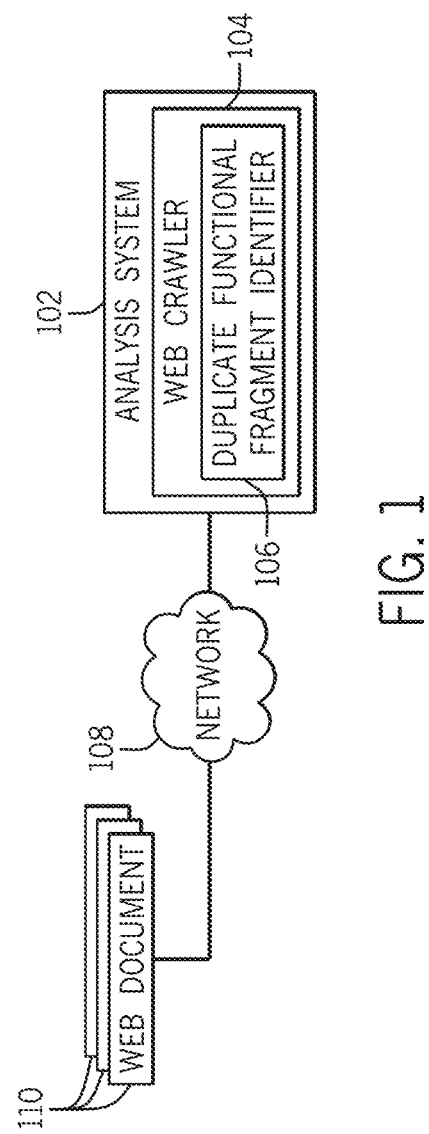
FIG. 1 is a block diagram of an example arrangement that includes a web crawler for locating and analyzing web content available over a network, in accordance with some implementations.

Web content accessible over a network can include dynamic web content. Examples of a network can include any or some combination of the following: the Internet, a local area network (LAN), a wide area network (WAN), a virtual private network (VPN), and so forth.

Dynamic web content includes content that is dynamically generated in response to an interaction (e.g. user interaction or interaction with a program) performed at a client device. A program includes machine-readable instructions, and can refer to software or firmware. Static web content includes content that is fixed and does not change in response to interaction with the web content.

Web content can be the subject of analysis, such as analysis performed by a web crawler (also referred to as a web spider). The web crawler is able to search a network to locate web content accessible over the network. Upon locating a document (also referred to as a "web document") containing web content (where a document or web document can refer to any file or object that includes or refers to web content), the web crawler can store location information (e.g. a uniform resource locator (URL) or other type of location information) of the web document, and can follow hyperlinks associated with the document to locate additional documents that contain web content. Based on such crawling of web content, the web crawler is able to generate an index based on content of the located web documents. An index produced by a web crawler can associate keywords or other items found in the web content with respective location information identifying locations of web content containing the keywords or other items.

A crawler that is able to analyze dynamic web content is able to simulate interaction (e.g. interaction by a user or a program) with the web content for the purpose of obtaining dynamic web content. A web document can include elements that if invoked would cause the retrieval of dynamic web content. In some examples, such elements can be associated with scripts (e.g. JavaScript scripts or other types of scripts). JavaScript is a scripting language that can be used for producing scripts, which are implemented as executable code including machine-readable instructions executed in a specific environment, such as an environment provided by a web browser.

As an example, when viewing a web page with a web browser, a user can select an element that is associated with a script. Selection of this element causes the script to execute. A script when executed can interact with a user (or program) to retrieve additional content (that is separate from the web page). This additional content is considered an example of dynamic web content Analyzing dynamic web content can be a relatively time consuming process, as compared to processing of static web content. In some cases, different web documents can share common functional fragments. A functional fragment can refer to a portion of a web document that includes elements for producing dynamic web content. Such elements can be associated with scripts.

Repeatedly analyzing the same functional fragments is inefficient. In accordance with some implementations, techniques or mechanisms are provided to allow for comparison of functional fragments to determine whether a particular functional fragment was previously analyzed or otherwise processed, such that processing of the particular functional fragment can be skipped.

FIG. 1 is a block diagram of an example arrangement that includes an analysis system 102. The analysis system 102 includes a web crawler 104, which can be implemented as machine-readable instructions executable in the analysis system 102. The web crawler 104 includes a duplicate functional fragment identifier 106, to allow the web crawler 104 to identify whether a particular functional fragment was previously been processed, so that repeated processing of the particular functional fragment can be avoided.

Although the analysis system 102 of FIG. 1 includes the web crawler 104, it is noted that in other implementations, the duplicate functional fragment identifier can be used with other types of programs.

The analysis system 102 is connected to a network 108. Various web documents 110 are accessible over the network 108. Although just one network 108 is shown in FIG. 1, it is noted that the analysis system 102 is able to access web documents 110 over multiple networks.

The web documents 110 can be written according to a specific markup language, such as any or some combination of the following: Hypertext Markup Language (HTML), eXtensible Markup Language (XML), and so forth. A markup language defines tags that are useable to represent various types of elements that form a web document. A web browser can read a web document according to the respective markup language, and the web browser can compose the content of the web document based on reading of the elements of the markup language. The web browser does not display the tags themselves, but uses the tags to interpret the content of the web document. Examples of elements in a web document that can be defined by tags include text, images, video, audio, and other objects. A markup language also can define elements that are associated with scripts.

A Document Object Model (DOM) is an application programming interface (API) for web documents according to markup languages, such as HTML, XML, and so forth. The DOM defines a logical structure of a web document, and also defines a way (using the API) the web document can be accessed and manipulated. Using a DOM, elements of a web document can be accessed, changed, deleted, or added by an entity such as a script. According to DOM, a web document has a tree-based logical structure, which includes a hierarchical arrangement of nodes that correspond to respective elements of the web document.

Figure 2:
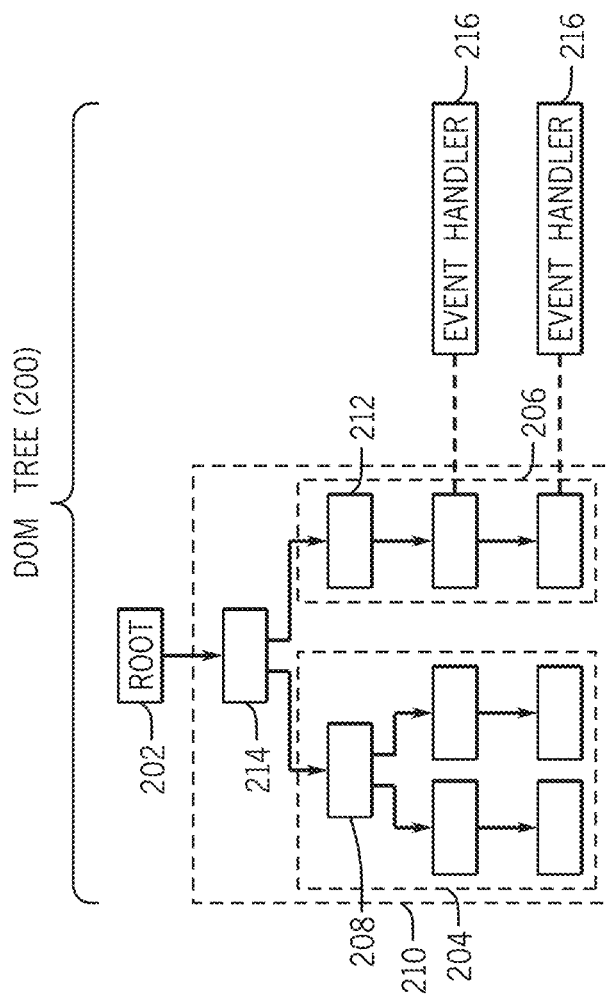
FIG. 2 is a schematic diagram of a domain object model (DOM) tree, which can be processed according to some implementations.

The tree-based logical structure can be referred to as a DOM tree. FIG. 2 shows an example DOM tree 200, which includes a root node 202 as well as other nodes below the root node 202. A DOM tree can include one or multiple DOM subtrees, such as DOM subtrees 204, 206, and 210 shown in FIG. 2. The most common ancestor of a DOM subtree is not the root node (e.g. 202) of the DOM tree. The lowest common ancestor (LCA) of a DOM subtree represents the element that is common among all elements of the DOM subtree. As an example, the LCA of the elements of the DOM subtree 204 is represented by node 208. Similarly, the LCA of the elements of the DOM subtree 206 is represented by node 212, and the LCA of the elements of the DOM subtree 210 is represented by node 214.

A DOM subtree that includes one or multiple functional elements (e.g. an element associated with a script) is a functional fragment of the DOM tree 200. As an example, the elements of a DOM subtree can represent elements of a user interface (provided in a web page) through which a user can interact with the web page. In this example, the different elements in the DOM subtree 204 can correspond to different selectable items of the user interface. A selection of an element made in the user interface causes a corresponding action to occur. User selection of an element in a user interface is an example of an event that can occur. Different types of events include events relating to the user clicking on a mouse device, a user moving a cursor over an element of a web page using a user input device, a user entering text into an input field of the user interface, a user stroking a key on a keyboard, a user touching a point on a touchscreen, and so forth.

To handle events generated due to user actions, event handlers can be registered with (or bound to) respective elements of the DOM subtree that a user can interact with. Stated differently, an event handler that is bound to an element is an event handler that has registered to be notified of a corresponding event relating to the element. In the example of FIG. 2, event handlers 216 are bound to certain respective elements of the DOM subtree 206. Although not shown, event handlers may also be bound to elements of other DOM subtrees.

An event handler can be implemented as machine-readable instructions that can perform a specified action (or actions) in response to occurrence of an event (e.g. user selection of an element in a web page). An event handler, upon detecting an event, can invoke a script (e.g. a JavaScript script), to perform a respective operation. Execution of the script can cause dynamic web content to be retrieved in response to the event.

Figure 3:
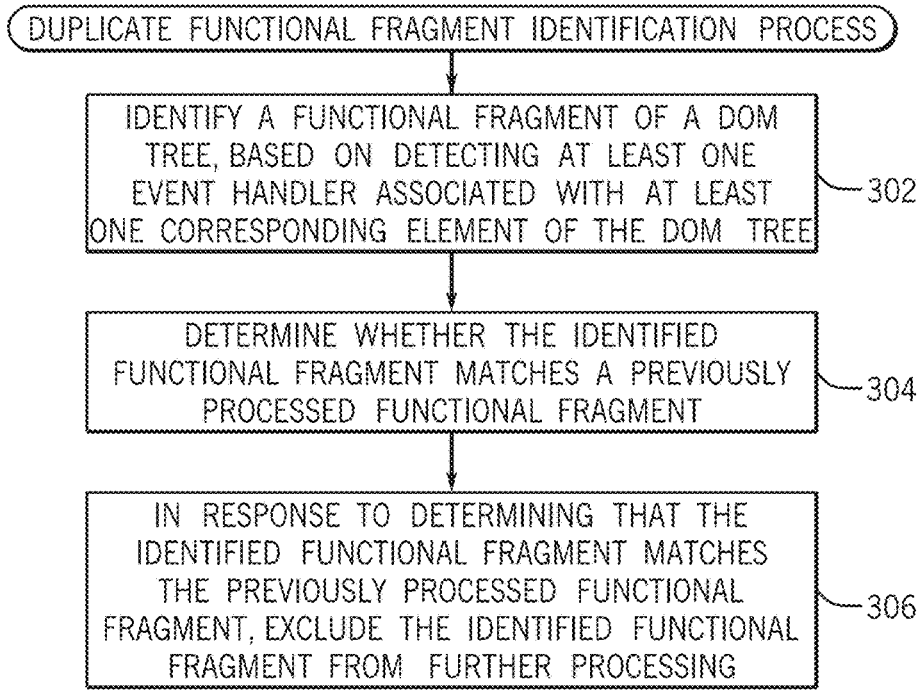
FIG. 3 is a flow diagram of a process according to some implementations.

FIG. 3 is a flow diagram of a process performed by the duplicate functional fragment identifier 106, according to some implementation. The duplicate functional fragment identifier 106 identifies (at 302) a functional fragment of a DOM tree, such as the DOM tree 200 in FIG. 2. The identifying of the functional fragment is based on detecting at least one event handler (e.g. 216 in FIG. 2) that is associated with at least one corresponding element of the DOM tree.

The duplicate functional fragment identifier 106 determines (at 304) whether the identified functional fragment matches a previously processed functional fragment. In response to determining that the identified functional fragment matches the previously processed functional fragment, the duplicate functional fragment identifier 106 excludes (at 306) the identified functional fragment from further processing, such as analysis by the web crawler 104 of FIG. 1 for purposes of indexing web content.

In some implementations, at task 302, the duplicate functional fragment identifier 106 can detect multiple event handlers associated with respective elements of the DOM tree. An element to which an event handler is bound can be associated with a signature, which can refer to information that is specific to the element. Elements that are part of the same DOM subtree can have matching signatures, where a signature of a first DOM element matches a signature of a second DOM element if at least a predefined portion of the signatures are the same.

A count can be maintained of the number of DOM tree elements (associated with respective event handlers) with matching signatures. This count is advanced (incremented or decremented) each time a DOM tree element (associated with an event handler) having a matching signature is encountered. Assuming the duplicate functional fragment identifier 106 has detected N (N>1) DOM elements (that are bound to respective event handlers) that have matching signatures, the count would be set to N.

Clusters of DOM tree elements with matching signatures are formed. Each cluster includes a respective group of DOM tree elements with matching signatures. In some examples, a group of DOM tree elements are clustered together to form a cluster if the number of DOM tree elements in the group exceeds a specified threshold (in other words, the corresponding count N is greater than or equal to this threshold).

Setting a threshold size of a cluster avoids the situation where there are too many DOM subtrees to consider for identifying duplicate functional fragments, which can lead to increased processing overhead.

For each cluster of DOM elements, the lowest common ancestor (LCA) is identified. If the LCA is not the DOM tree root, then a DOM subtree (which is a functional fragment) has been discovered, and thus is identified at task 302 in FIG. 3.

Figure 4:
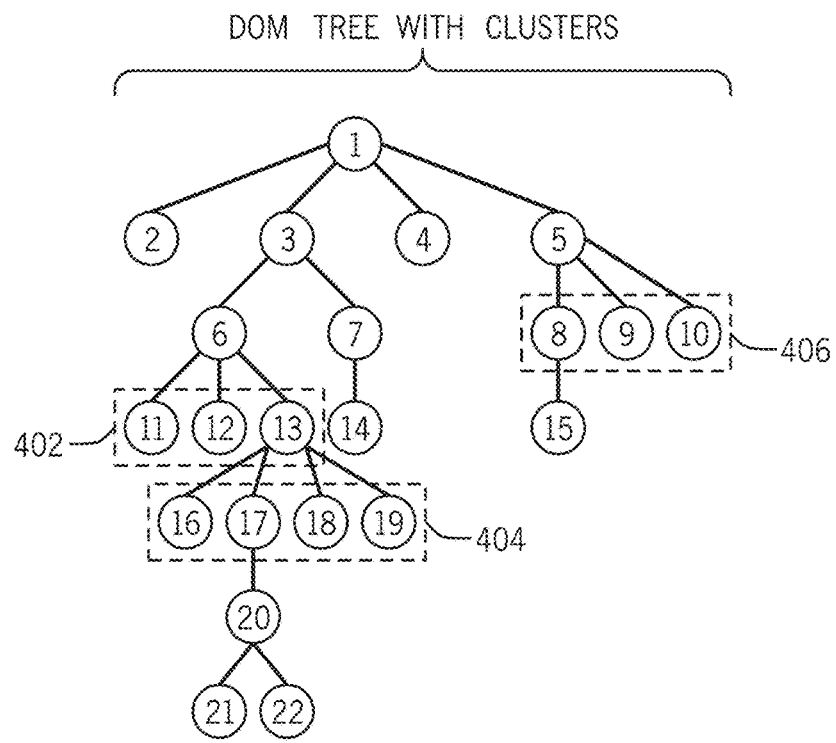
FIG. 4 is a schematic diagram of an example DOM tree in which clusters of elements have been identified, in accordance with some implementations.

FIG. 4 shows an example of a DOM tree with clusters 402, 404, and 406 identified in the manner discussed above. The cluster 402 includes elements 11, 12, and 13; the cluster 404 includes elements 16, 17, 18, and 19; and the cluster 406 includes elements 8, 9, and 10. In the example of FIG. 4, the LCA of the cluster 402 is element 6, the LCA of the cluster 404 is element 13, and the LCA of the cluster 406 is element 5. Since the LCAs of these clusters are not the root node (element 1), the clusters 402, 404, and 406 are part of respective DOM subtrees.

Figure 5:
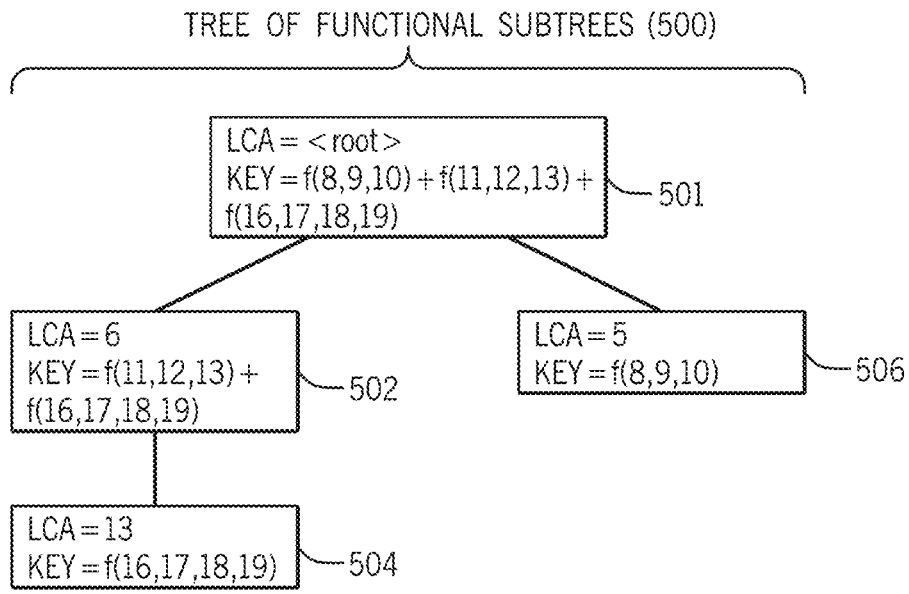
FIG. 5 is a schematic diagram of a tree of DOM subtrees, according to some implementations.

Once the DOM subtrees are identified, a tree of DOM subtrees, such as 500 depicted in FIG. 5, is formed. In FIG. 5, DOM subtrees 502, 504, and 506 correspond to clusters 402, 404, and 406, respectively. Note that DOM subtree 502 includes DOM subtree 504. The tree 500 of DOM subtrees has a root 501.

Each node in the tree 500 of DOM subtrees depicted in FIG. 5 is assigned a key, which can be considered a signature of the DOM subtree. In some examples, the key of a DOM subtree is computed based on signatures of the DOM tree elements in the respective DOM subtree. For example, the DOM subtree 506, which includes elements 8, 9, and 10 in the DOM tree shown in FIG. 4, is assigned a key that is produced by applying a function on the signatures of elements 8, 9, and 10. The function, represented as f, can be a hash function such that the key that is produced is a hash value. In other examples, other types of functions can be employed.

The DOM subtree 504 is assigned a key that is calculated by applying the function f to the signatures of elements 16, 17, 18, and 19. The key assigned to the DOM subtree 502 is based on the following values: (1) the key for the DOM subtree 504 (which depends from the DOM subtree 502), and (2) the value produced by applying the function f to elements 11, 12, and 13 that are part of the DOM subtree 502. Values (1) and (2) can be aggregated (such as summed, multiplied, concatenated, etc.) to form the key for the DOM subtree 502.

The root 501 is assigned a key that is based on the keys of all the DOM subtrees 502, 504, and 506.

After the tree 500 of DOM subtrees has been created, the tree 500 of DOM subtrees can be traversed by the duplicate functional fragment identifier 106, starting at the root 501. For each DOM subtree of the tree 500 that is currently considered, the duplicate functional fragment identifier 106 attempts to match the DOM subtree's key to a key of a DOM subtree that was previously processed (by comparing the DOM subtree's key to keys of previously processed DOM subtrees). If a match is identified, then a determination can be made (task 304 in FIG. 3) that the currently considered DOM subtree is the same as a previously processed DOM subtree.

In addition to matching keys of DOM subtrees, in some implementations, a further verification can be performed when the duplicate functional fragment identifier 106 detects matching keys. For example, the duplicate functional fragment identifier 106 detects that the key of a given DOM subtree (of the tree 500) matches a key of a previously processed DOM subtree, then the duplicate functional fragment identifier 106 can perform the further verification.

The further verification can compare the structure of markup language tags (e.g. HTML tags) in the currently considered DOM subtree (of the tree 500) to the structure of markup language tags in the matching previously processed DOM subtree. If the structures are determined to be similar enough, to within a specified threshold, then a match is declared, and the currently considered DOM subtree can be excluded from further processing. For example, a match may be declared if greater than a specified percentage of the markup language tags match in the DOM subtrees.

If a match in the structures is not found, then the key of the currently considered DOM subtree is stored, and the tag structure of the currently considered DOM subtree is also stored in a database. The duplicate functional fragment identifier 106 continues to traverse the tree 500 of DOM subtrees until no further DOM subtrees are available for consideration. To improve efficiency, the duplicate functional fragment identifier 106 can exclude from traversal any DOM subtree of the tree 500 that is a descendant of a DOM subtree that has already been matched. For example, if the duplicate functional fragment identifier 106 determines that the DOM subtree 502 matches a previously processed DOM subtree (as confirmed by the further verification), then the duplicate functional fragment identifier 106 can exclude the DOM subtree 504 (which is a descendant of the DOM subtree 502) from further consideration in the matching process.

As discussed above, elements of a DOM tree that are bound to event handlers are associated with respective signatures. The signatures of the elements in a DOM subtree can be used to derive the key of the DOM subtree, for use in matching to keys of previously processed DOM subtrees.

The following describes how a signature for an element that is bound to an event handler is derived. In some examples, the signature of such an element can include an XPath (XML Path Language) string (or expression) that is useable to locate an element in a web document. Although reference is made to using an XPath string in some examples, it is noted that in other examples, other types of information can be used to form a signature for an element that is bound to an event handler.

In some examples, the signature of the DOM tree element is the XPath string of the DOM tree element, subject to the following exceptions. If an ancestor element of the DOM tree element has a unique identifier or a unique name, then this unique identifier or name is used as an attribute in the XPath string of the DOM tree element. The XPath string for the DOM tree element can start with the unique identifier or name of the ancestor element. If the foregoing is true of more than one ancestor element, then the unique identifier or name of the closest ancestor element (to the DOM tree element for which the signature is being generated) is used.

The identifier or name of the ancestor element can be modified so that matches across multiple DOM trees can be performed. For example, any random number, timestamp, or similar temporary code can be removed from the identifier or name of the ancestor element.

If the DOM tree element itself has a unique identifier or name within the DOM tree, the unique identifier or name of the DOM tree element is not used.

In some implementations, the positions of the DOM tree elements in an ancestor chain are not used for discrimination purposes in an XPath string. By not using positions of DOM tree elements, matching of signatures would be based on other attributes, such as the ancestor identifier or name, or other attributes.

Figure 6:
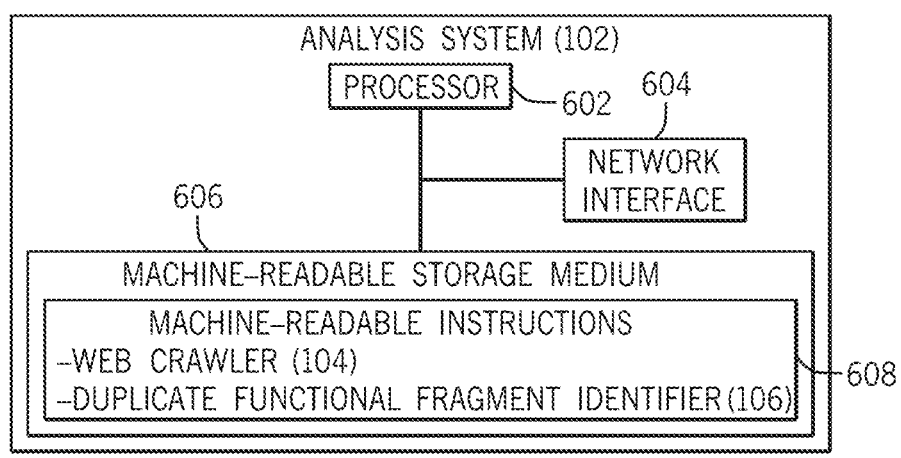
FIG. 6 is a block diagram of an example computer system, according to some implementations.

FIG. 6 is a block diagram of the analysis system 102 according to some examples. The analysis system 102 can include one or multiple processors 602. A processor can include a microprocessor, microcontroller, processor module or subsystem, programmable integrated circuit, programmable gate array, or another control or computing device. The processor(s) 602 can be coupled to a network interface 604 (for communications over a network) and to a non-transitory machine-readable or computer-readable storage medium (or storage media) 606. The storage medium (or storage media) 606 can store machine-readable instructions 608 of the web crawler 104 and the duplicate functional fragment identifier 106.

The storage medium (or storage media) 606 can be implemented as one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
identifying, by a system including a processor, a functional fragment of a document object model (DOM) tree, the identifying based on detecting plural handlers associated with corresponding elements of the DOM tree and generating signatures for the elements associated with the plural handlers, each handler of the plural handlers to cause execution of executable code;
determining, by the system, whether the identified functional fragment matches a previously processed functional fragment; and
in response to determining that the identified functional fragment matches the previously processed functional fragment, excluding the identified functional fragment from further processing.

2. The method of claim 1, further comprising generating a key for the identified functional fragment, wherein the determining is based on comparing the key for the identified functional fragment to a key of the previously processed functional fragment.

3. The method of claim 2, wherein generating the key for the identified functional fragment is based on the signatures for at least a subset of the elements.

4. The method of claim 3, wherein generating the key for the identified functional fragment is based on applying a function to the signatures for at least the subset of the elements.

5. The method of claim 2, further comprising comparing a structure of the identified functional fragment with a structure of the previously processed functional fragment, wherein the excluding is further in response to comparing the structures.

6. The method of claim 5, wherein the comparing the structures comprises comparing a structure of markup language tags of the identified functional fragment with a structure of markup language tags of the previously processed functional fragment.

7. The method of claim 1, further comprising forming clusters of the elements based on the signatures, wherein each of the clusters includes elements that have matching signatures.

8. The method of claim 1, wherein generating the signatures comprises generating XPath strings for the elements associated with the plural handlers.

9. The method of claim 1, wherein excluding the identified functional fragment from the further processing comprises excluding the identified functional fragment from analysis by a web crawler that analyzes dynamic web content.

10. The method of claim 1, wherein the executable code caused to be executed by each handler of the plural handlers comprises a respective script.

11. The method of claim 1, wherein the plural handlers are registered with the corresponding elements to be notified of respective events relating to the corresponding elements.

12. A system comprising:
at least one processor to:
identify a functional fragment of a document object model (DOM) tree, the identifying based on detecting event handlers associated with corresponding elements of the DOM tree, the event handlers to invoke respective scripts;
identify a cluster of the elements that have matching signatures;
determine whether the identified functional fragment matches a previously processed functional fragment; and
in response to determining that the identified functional fragment matches the previously processed functional fragment, exclude the identified functional fragment from further processing.

13. The system of claim 12, wherein the further processing comprises processing of a web crawler.

14. The system of claim 12, wherein identifying the functional fragment is based on a determination that a lowest common ancestor of the cluster of elements is not a root node of the DOM tree.

15. The system of claim 12, wherein the identifying of the functional fragment is responsive to the cluster having a number of the elements that have the matching signatures exceeding a threshold.

16. An article comprising at least one non-transitory machine-readable storage medium storing instructions that upon execution cause a system to:
identify event handlers associated with elements of a document object model (DOM) tree, the event handlers to invoke corresponding executable code;
generate signatures for the elements;
discover a functional fragment of the DOM tree based on clustering the elements according to the generated signatures;
determine whether the discovered functional fragment matches a previously processed functional fragment; and
in response to determining that the discovered functional fragment matches the previously processed functional fragment, exclude the discovered functional fragment from processing by a web crawler.

17. The article of claim 16, wherein the instructions upon execution cause the system to generate a key for the discovered functional fragment based on the signatures of at least a subset of the elements, and wherein determining whether the discovered functional fragment matches the previously processed function fragment uses the key.

18. The article of claim 17, wherein generating the key for the discovered functional fragment is based on applying a function to the signatures of at least the subset of the elements.

* * * * *